Feb. 6, 1923.
P. A. CONNELLY.
FENDER.
FILED FEB. 7, 1921.
1,444,496.
2 SHEETS—SHEET 2.
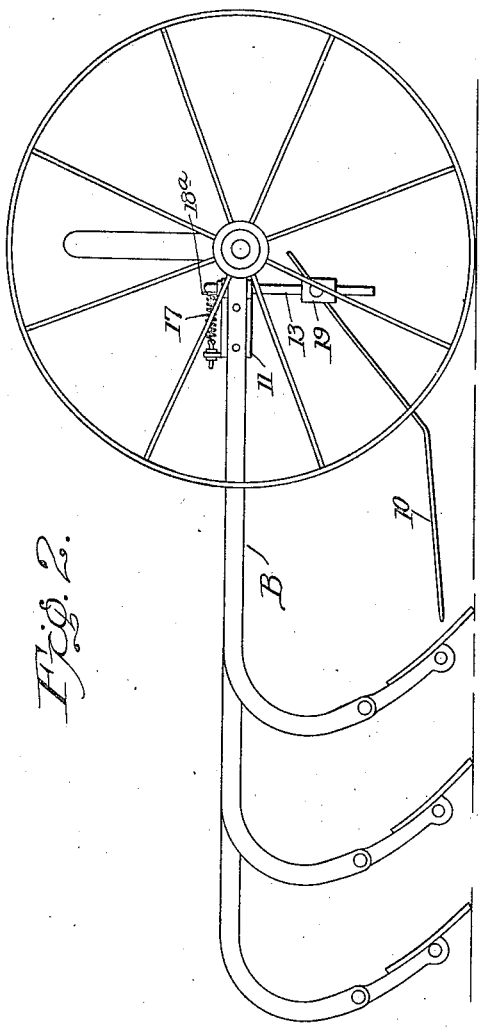
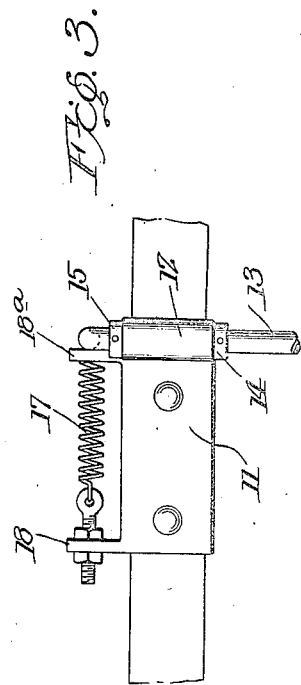
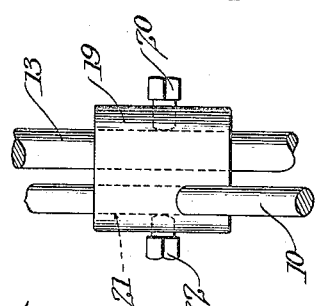
Peter A. Connelly,
INVENTOR Patented Feb. 6, 1923.

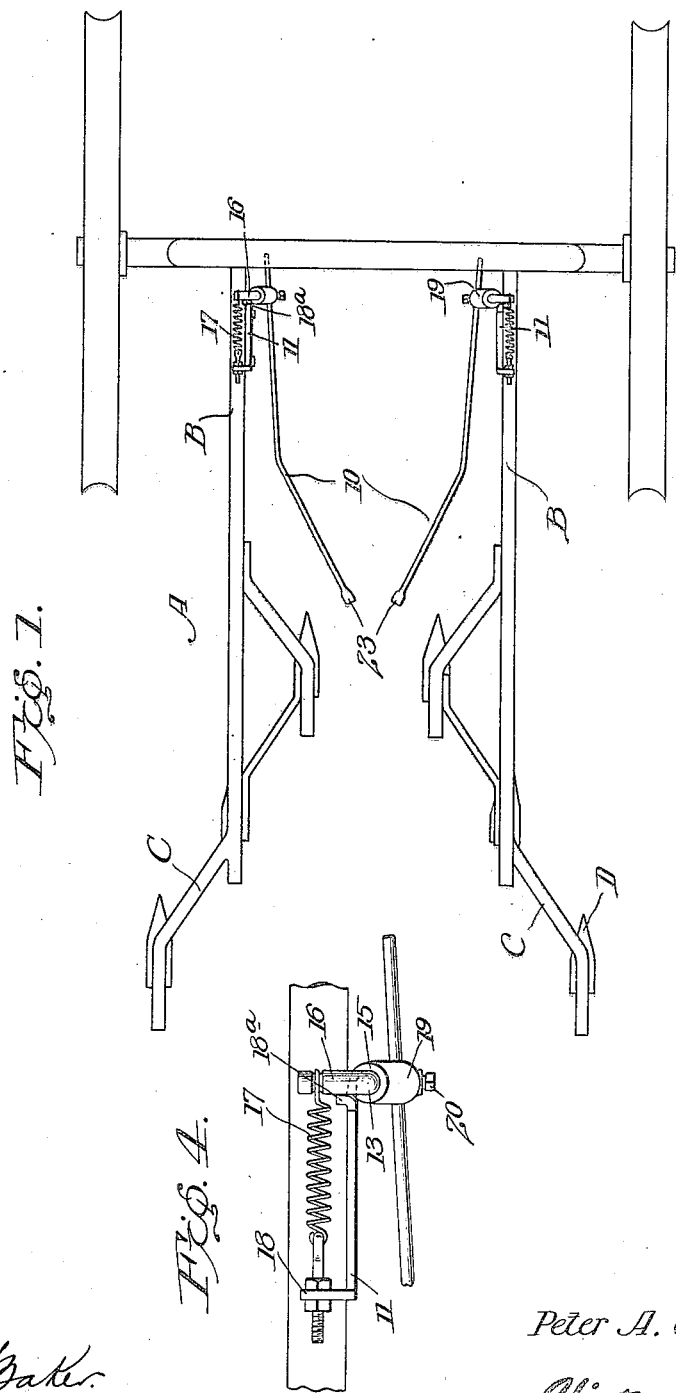

1,444,496

UNITED STATES PATENT OFFICE.

PETER A. CONNELLY, OF NORTH BEND, OHIO.

FENDER.

Application filed February 7, 1921. Serial No. 443,148.

*To all whom it may concern:*

Be it known that I, PETER A. CONNELLY, a citizen of the United States, residing at North Bend, in the county of Hamilton and State of Ohio, have invented new and useful Improvements in Fenders, of which the following is a specification.

This invention relates to attachments for disk or other plow devices used in the cultivation of growing grain, and has for its object the provision of fenders adapted to press down weeds so that they will be covered by the soil thrown up by the disks or shovels of the plow device, the fender being of such material and so constructed and arranged as not to bend down or otherwise injure the growing corn.

An important object is the provision of a device of this character which is adjustable as to length, tension, and other details.

An additional object is the provision of a device of this character which will be simple and inexpensive in construction, highly efficient in use, durable in service, and a general improvement in the art.

With the above and other objects and advantages in view, the invention consists in the details of construction to be hereinafter more fully described and claimed and illustrated in the accompanying drawings in which—

Figure 1 is a plan view showing my fender arrangement applied,

Figure 2 is a side elevation,

Figure 3 is a detailed elevation of a portion of one side of the plow frame showing the mounting of the fenders, Figure 4 is an enlarged plan view of the parts shown in Figure 3 and Figure 5 is a fragmentary detail view showing the mounting of the fender rods.

Referring more particularly to the drawings, the letter A designates broadly the frame of a disk or shovel plow of the type used in the cultivation of corn, this frame including side bars B, one or more end bars C, and shovels or disks D, the shovels being shown in the present instance. This device is of course equipped with suitable draft means and would naturally include various details common to devices of this character, but as such are not essential to a proper understanding of the invention, they are not dwelt upon.

In carrying out my invention I provide a pair of fenders 10 which are mounted upon the frame bars B and each fender is formed from a suitable length of spring steel rods of comparatively small gage or diameter so that it will be easily resilient. In actual practice a size ranging from one-eighth to one-fourth of an inch might be found quite satisfactory. These rods are formed slightly angularly, as shown, so that their portions toward the rear end of the plow will be substantially horizontal and will be very close to the ground.

Secured upon each frame bar B is a plate 11 held in place by means of suitable bolts or the like. At one end of each plate is a sleeve 12 which extends vertically and journaled through this sleeve is a short rod 13 which is prevented from upward sliding movement by a washer 14 secured thereon and bearing against the lower end of the sleeve 12. Likewise secured upon each rod 13 is a similar washer 15 engaging against the upper end of the sleeve for preventing downward movement of the rod. Above the sleeve each rod 13 is formed with a laterally bent arm 16 with the free end of which is connected a coil spring 17 which has its other end connected with a short post or lug 18 formed on the plate 11. On the plate 11 is an upstanding post 18$^a$ serving as a stop for the arm 16 to prevent inward swinging of the fenders.

Slidably mounted upon the lower portion of each rod 13, that is below the sleeve, is a block or collar 19 held in adjusted position upon the rod 13, as by a set screw 20, and this block is formed with a hole 21 through which is slidably adjustably passed the forward end of the fender 10, the fender being held in adjusted position as by a suitable set screw 22.

When the parts are constructed and arranged as above described, it will be seen that the fender rods 10 may move apart when they engage against growing corn stalks as it is known that the stalks are sufficiently strong and stiff as to resist bending by the fenders. The engagement of the fenders with the weeds, grass and the like will, however, cause such matter to bend over onto the ground so that the dirt thrown up by the shovels or disk D will fall upon and cover the weeds and grass. The length of the fenders is regulated by means of this adjustable engagement with the blocks 19 and the vertical position is regulated by means of the adjustment of the blocks 19 upon the rods 13 so that the rear end portions of the fenders may be brought close to the ground and parallel therewith. In actual practice it is preferable that the rear ends of the fenders be flattened, as indicated at 23, where they trail upon the ground. As the fenders are arranged in V-shape, it will be apparent that all the weeds and grass will be engaged thereby and pressed down.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In combination with a plow device including a frame and a plurality of ground engaging members carried thereby, a fender device comprising brackets secured upon the frame, a pair of upright rods rotatably mounted within said brackets, spring means for opposing rotation of said rods, sleeve members vertically slidably and rotatably adjustably mounted upon said rods, and resilient rods longitudinally adjustably mounted within said sleeve members.

2. In combination with a plow device including a frame and ground engaging members, a fender device comprising brackets secured upon the frame, upright rods rotatably mounted within said brackets and having their upper ends formed with crank arms, springs connected with said brackets and with said crank arms for opposing rotation of the rods, sleeve members adjustably mounted upon said rods, and resilient rods adjustably connected with said sleeve members.

In testimony whereof I affix my signature.

PETER A. CONNELLY.